(12) United States Patent
Kato et al.

(10) Patent No.: US 6,928,041 B2
(45) Date of Patent: Aug. 9, 2005

(54) PRE-PIT DETECTING APPARATUS FOR OPTICAL RECORDING MEDIUM

(75) Inventors: Masahiro Kato, Tokorozawa (JP); Naoharu Yanagawa, Tokorozawa (JP); Tatsuhiro Yone, Tokorozawa (JP); Yuko Muramatsu, Tokorozawa (JP); Shinji Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 558 days.

(21) Appl. No.: 10/062,556

(22) Filed: Feb. 5, 2002

(65) Prior Publication Data
US 2002/0114248 A1 Aug. 22, 2002

(30) Foreign Application Priority Data
Feb. 6, 2001 (JP) ........................................ 2001-030108

(51) Int. Cl.$^7$ .............................................. G11B 7/007
(52) U.S. Cl. ................................ 369/53.24; 369/59.17; 369/59.18
(58) Field of Search .......................... 369/53.24, 59.17, 369/59.18, 59.21

(56) References Cited

U.S. PATENT DOCUMENTS

| | | | | |
|---|---|---|---|---|
| 5,831,951 A | * | 11/1998 | Kamioka et al. | 369/47.26 |
| 6,058,093 A | * | 5/2000 | Kato et al. | 369/124.14 |
| 6,081,490 A | | 6/2000 | Kuroda et al. | |
| 6,181,657 B1 | * | 1/2001 | Kuroda et al. | 369/59.1 |
| 6,487,149 B1 | * | 11/2002 | Yokoi et al. | 369/47.25 |

FOREIGN PATENT DOCUMENTS

EP  0 880 132 A2  11/1998

OTHER PUBLICATIONS

Japanese Abstract No. 2000260025, dated Sep. 22, 2000.
Japanese Abstract No. 2000113463, dated Apr. 21, 2000.
Japanese Abstract No. 2000207744, dated Jul. 28, 2000.
Japanese Abstract No. 03266221, dated Nov. 27, 1991.

* cited by examiner

Primary Examiner—Brian E. Miller
Assistant Examiner—Michael V. Battaglia
(74) Attorney, Agent, or Firm—Sughrue Mion, PLLC

(57) ABSTRACT

A pre-pit detecting apparatus which, when a light beam is radiated onto an optical recording medium having a recording surface with pre-pits repeatedly formed between tracks, receives light reflected by the recording surface with first and second light receiving faces, obtains the push-pull signal corresponding to the light receiving signals for the first and second light receiving faces, and binarizes the push-pull signal by using a threshold value to generate a pre-pit detection signal. It is judged which area of a plurality of areas including at least a not-yet-recorded area corresponds to a position of the recording surface where the light beam is radiated is performed to judge. Then the threshold value is set in accordance with the judgement result.

10 Claims, 14 Drawing Sheets

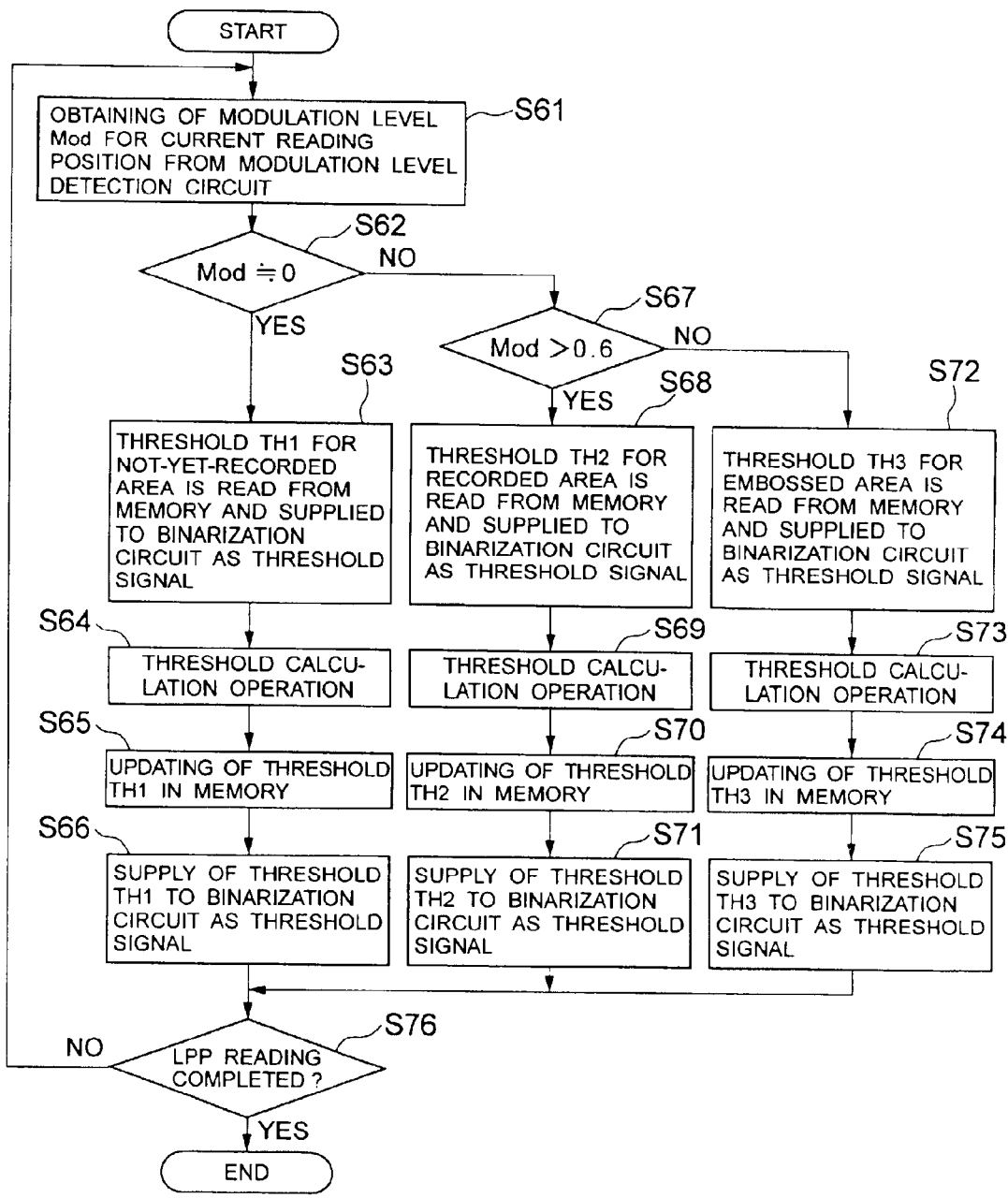

PRE-PIT DETECTING APPARATUS FOR OPTICAL RECORDING MEDIUM

BACKGROUND OF THE INVENTION

1. Field of the Invention

The present invention relates to a pre-pit detecting apparatus for an optical recording medium having a recording surface with pre-pits carrying information concerning tracks repeatedly formed between the tracks.

2. Description of the Related Background Art

Recently, CD-R, CD-RW, DVD-R, DVD-RW, DVD-RAM and so on have been widely known as optical recording discs to which information data can be written. In addition, information recording/playing apparatuses to record and reproduce information by using such recording discs have been developed as products.

FIG. 1 is a schematic diagram of the area configuration of a DVD-RW as a recording disc described above.

As shown in FIG. 1, a DVD-RW disc has a data structure with a PCA (Power Calibration Area), an RMA (Recording Management Area), a lead-in area, data area, and a lead-out area from the inner circumference to the outer circumference of the disc. The PCA is an area for trial writing to determine the recording power of the laser beam and the RMA is an area in which management information related to recording is written. The lead-in area is provided with an embossed area formed as its part. The embossed area has phase pits formed on the disc in advance and sometimes records the information related to copy prevention.

FIG. 2 is a diagram of a part of the recording surface of such recordable disc.

As shown in FIG. 2, a disc substrate 101 has convex groove tracks 103 where information pits (marks) Pt to carry information data are to be formed spirally or concentrically, as well as concave land tracks 102 formed alternately on the board. Several LPPs (land pre-pits) 104 are formed between the adjacent groove tracks 103. The LPPs 104 are previously provided on the land tracks 102 to indicate recording timing and addresses of information data recorded by a disc recorder. The LPPs are formed as pits from the side of the disc substrate 101.

A disc player which plays an optical disc having such LPP's is provided with an LPP detection circuit. The LPP detection circuit is configured with a binarization circuit. Using its pickup, it receives the beam reflected from the optical disc with a light detector divided, for example, into two parts in the track tangent direction, and obtains the differential signal of the output signals from that optical detector, or the radial push-pull signal PP. The push-pull signal PP has a waveform as shown in FIG. 3 and the LPP component is a component projecting from the push-pull signal PP. Thus, by comparing the level of the push-pull signal PP and a threshold, a pre-pit detection signal $PP_D$ to indicate the detection of an LPP can be generated.

The pre-pit detection signal $PP_D$ has, as shown in FIG. 4, a level change like a pulse generated at every pickup reading position corresponding to an LPP. As shown in FIG. 4, a sync pulse $P_{SYNC}$, which appears for every cycle T, is contained in the pre-pit detection signal $PP_D$. The sync pulse $P_{SYNC}$ is followed by two pre-data pulses with a certain interval, but they do not always exist in every cycle to represent an address or other data. In FIG. 4, the third pulse from the sync pulse $P_{SYNC}$ is the pre-data pulse $P_D$ to carry the sector address. When recording information to an optical disc, the address on the optical disc is detected based on this pre-pit detection signal $PP_D$ for information recording.

However, even though the LPP and other pre-pits carry the addresses that are so important in information recording, the level of the section corresponding to the pre-pit in the push-pull signal is not constant. It is known to fluctuate depending on the pickup reading conditions such as tracking position. Therefore, it is difficult to set the threshold appropriately to binarize the push-pull signal.

SUMMARY OF THE INVENTION

An object of the present invention is to provide a pre-pit detecting apparatus which can appropriately set a threshold value for detecting a pre-pit component from a push-pull signal.

According to the present invention, there is provided a pre-pit detecting apparatus for an optical recording medium having a recording surface provided with pre-pits which are repeatedly formed between tracks and carries information related to said tracks, comprising: an optical head having a light receiving surface divided into a first and second light receiving faces in the tangential direction of said track, for receiving the reflected light of a light beam radiated onto said recording surface on said first and second light receiving faces to output first and second light detection signals corresponding to respective amounts of the received light on said first and second light receiving faces; a subtractor for calculating the difference between said first and second light detection signals output from said optical head to generate a push-pull signal; a binarization device for comparing said push-pull signal with a threshold value to generate a pre-pit detection signal; a judging device for judging an area to which a position of said recording surface where the light beam is radiated by said optical head belongs of a plurality of areas including at least a not-yet-recorded area and a recorded area; and a threshold setting device for setting said threshold value corresponding to the judgement result of said judging device.

According to the present invention, there is provided a pre-pit detection method for an optical recording medium having a recording surface provided with pre-pits which are repeatedly formed between tracks and carries information related to said tracks, comprising: an optical step for receiving the reflected light of a light beam radiated onto said recording surface on said first and second light receiving faces divided in the tangent direction of said track, to output first and second light detection signals corresponding to respective amounts of the received light on said first and second light receiving faces; a subtraction step for calculating the difference between said first and second light detection signals to generate a push-pull signal; a binarization step for comparing said push-pull signal with a threshold value to generate a pre-pit detection signal; a judging step for judging an area to which a position of said recording surface where the light beam is radiated in said optical step belongs of a plurality of areas including at least a not-yet-recorded area and a recorded area; and a threshold setting step for setting said threshold value corresponding to the judgement result of said judging step.

According to the present invention, there is provided a computer data signal embodied in a carrier wave and representing a series of instructing which cause a computer to perform steps to execute an detecting process in a pre-pit detecting apparatus for an optical recording medium having a recording surface provided with the pre-pits which are repeatedly formed between tracks and carries information related to said tracks, the steps comprising an optical step for receiving the reflected light of a light beam radiated onto said recording surface on said first and second light receiving faces divided in the tangent direction of said track, to output first and second light detection signals corresponding to respective amounts of the received light on said first and second light receiving faces; a subtraction step for calculating the difference between said first and second light detection signals to generate a push-pull signal; and a binarization step for comparing said push-pull signal with a threshold value to generate a pre-pit detection signal, the steps comprising: a judging step for judging an area to which a position of said recording surface where the light beam is radiated in said optical step belongs of a plurality of areas including at least a not-yet-recorded area and a recorded area; and a threshold setting step for setting said threshold value corresponding to the judgement result of said judging step.

BRIEF DESCRIPTION OF THE DRAWINGS

FIG. 5 is a block diagram of an information recording/reproducing apparatus which the present invention applies to;

FIG. 15 is a flowchart illustrating another threshold signal generation operation by the CPU in the threshold setting circuit in FIG. 7;

DETAILED DESCRIPTION OF THE PREFERRED EMBODIMENTS

Referring to the attached figures, the preferred embodiments of the present invention will be described in detail below.

Figure 1:
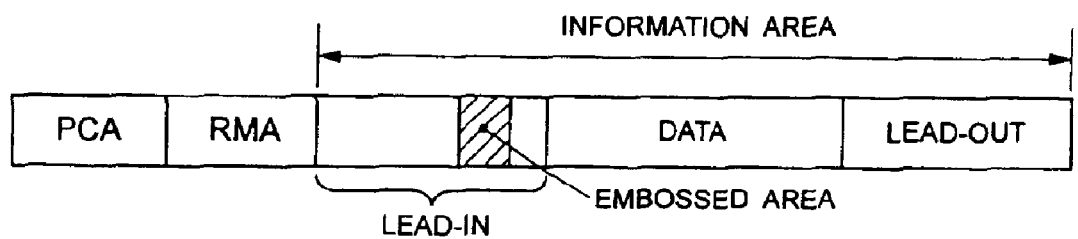
FIG. 1 is a diagram of the layout structure of the areas of a DVD-RW.
Figure 2:
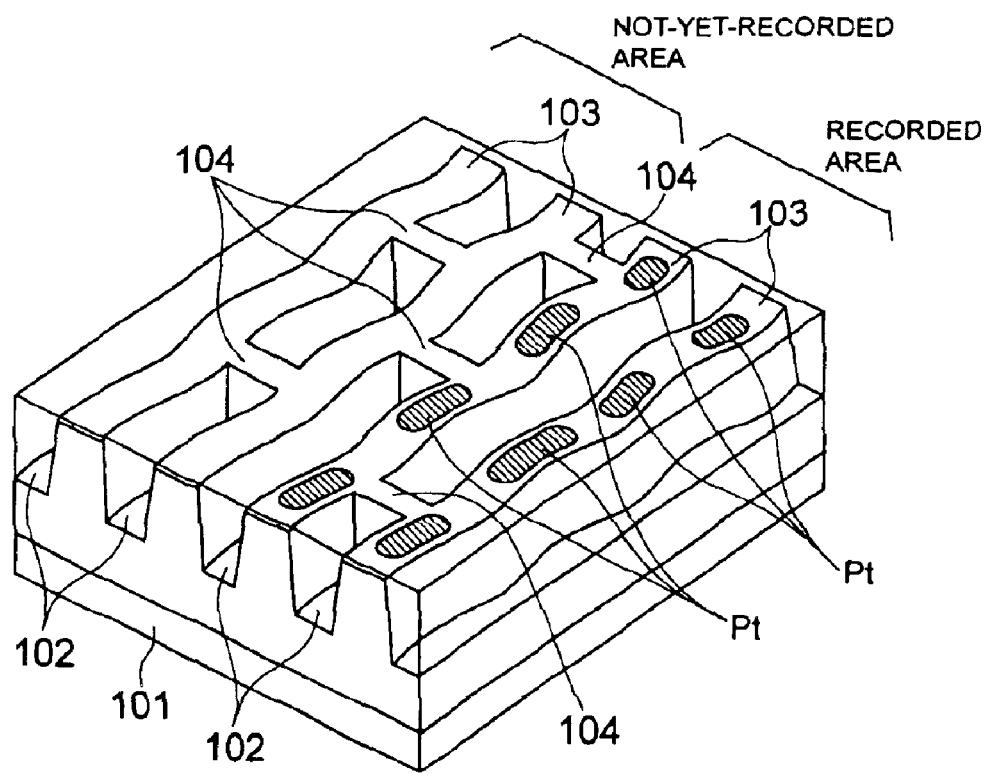
FIG. 2 is a diagram of the structure of the recording surface of a DVD-RW.
Figure 3:
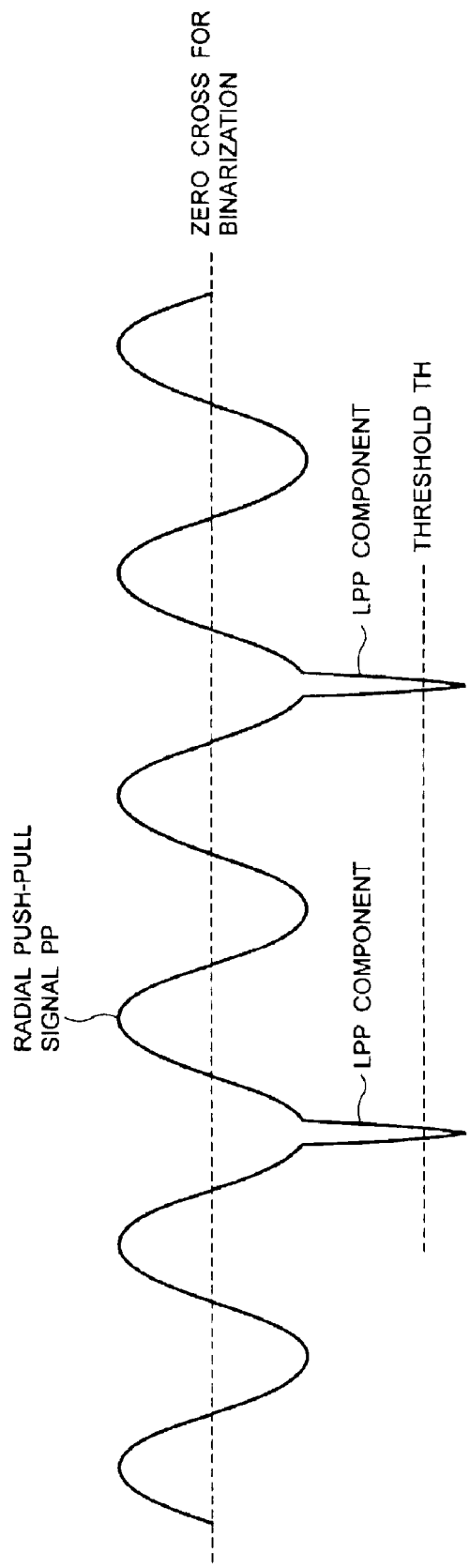
FIG. 3 is a diagram of a waveform of a radial push-pull signal containing a LPP component.
Figure 4:
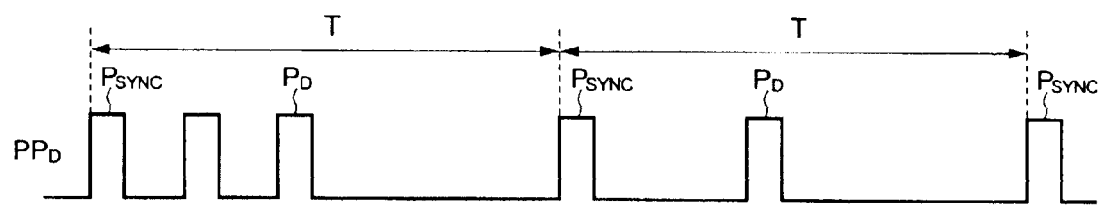
FIG. 4 is a diagram of a waveform of a pre-pit detection signal.
Figure 5:
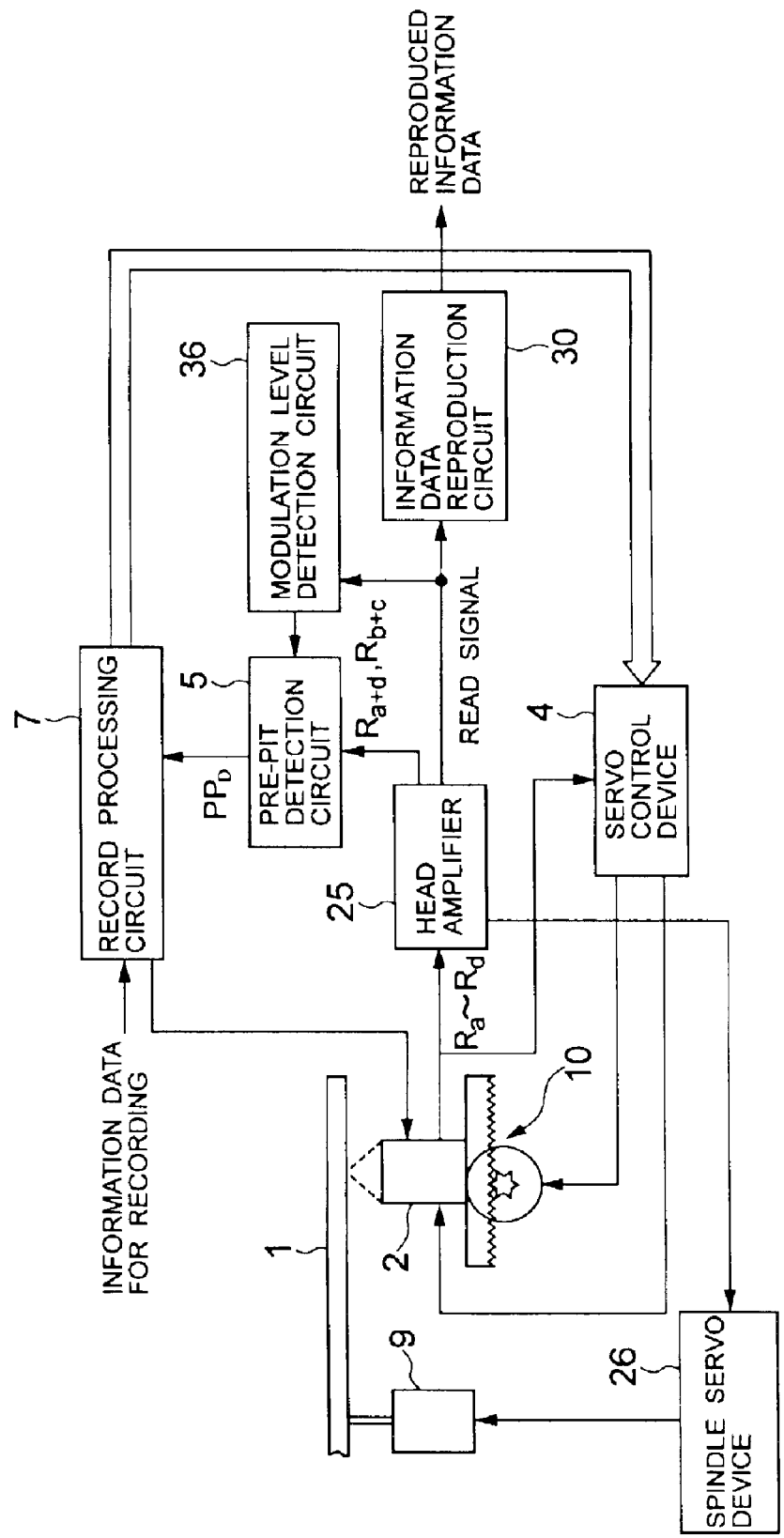

FIG. 5 shows an information recording/reproducing apparatus to which a pre-pit detecting apparatus according to the present invention is applied. In this information recording/reproducing apparatus, a recording/reproducing head 2 is provided with a recording beam light generator (not shown) for recording of information data to a multi-session type or rewritable optical disc 1 having a recording surface as shown in FIG. 2, a reading beam light generator (not shown) for reading recorded information (containing information data) from the optical disc 1 and a four-section optical detector (reference numeral 20 in FIG. 6).

The recording beam light generator and the reading beam light generator are not necessarily provided separately. They may be formed as a single light beam generator which generates a recording light beam for recording and a reading light beam for reading.

Figure 6:
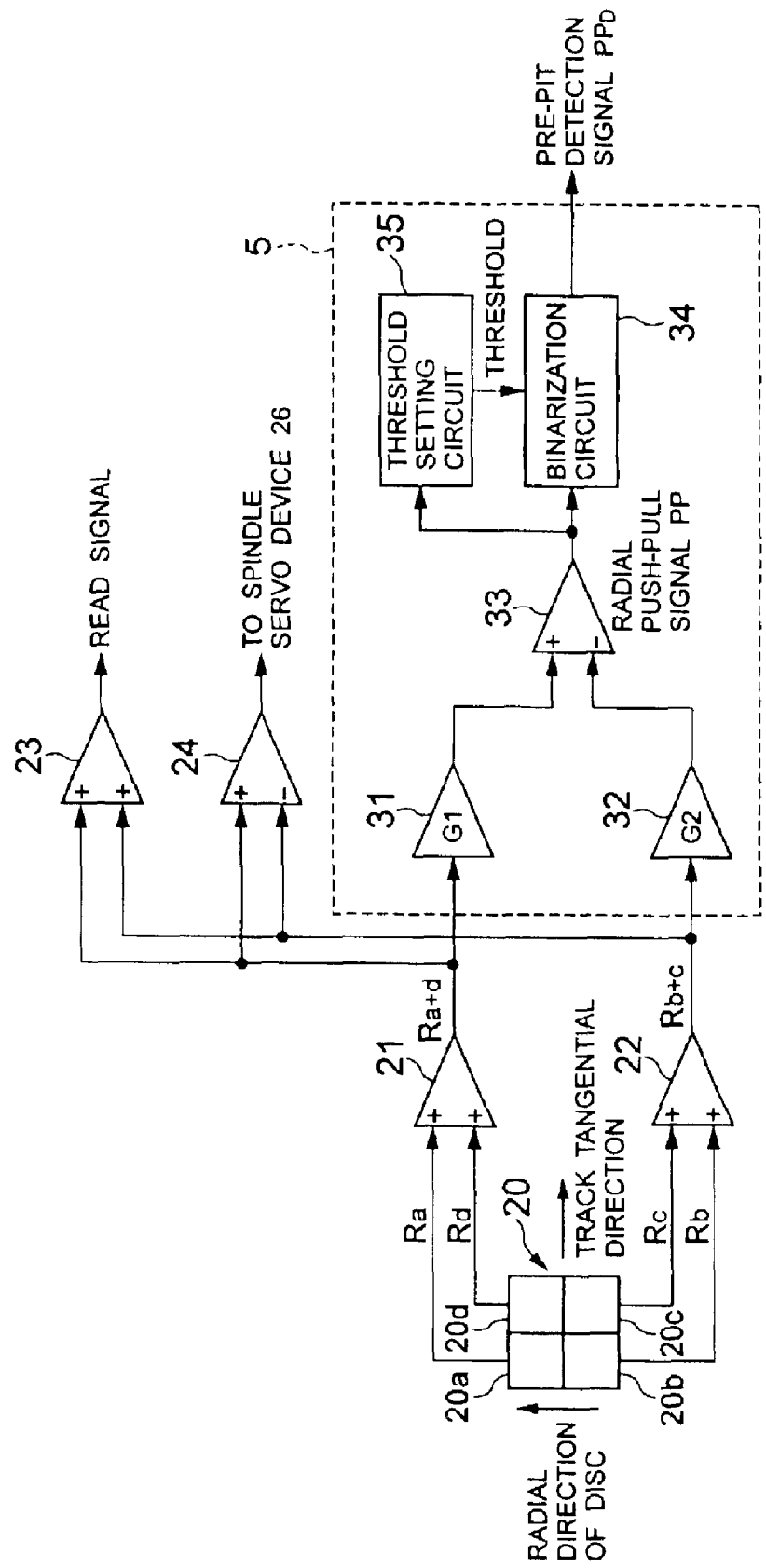
FIG. 6 is a block diagram of the configuration of a pre-pit detection circuit in the apparatus in FIG. 5.

The reading beam light generator illuminates the optical disc 1 rotationally driven by a spindle motor 9 with the reading beam light and forms an information reading spot on its recording surface. A four-section optical detector 20 comprises, as shown in FIG. 6, a photoelectric conversion device having light receiving faces 20a to 20d divided into four sections in the direction along the tangent of the information recording track (groove track 103) on the optical disc 1 and the direction orthogonal to the tangent of the recording track. The photoelectric conversion device receives the light reflected from the optical disc 1 by the information reading spot using each of the four light receiving faces 20a to 20d, individually converts the respective received light into electric signals and outputs them as light receiving signals Ra to Rd.

A servo control device 4 generates a focus error signal, a tracking error signal, and a slider driving signal based on these light receiving signals Ra to Rd. The focus error signal is supplied to the focusing actuator (not shown) incorporated in the recording/reproducing head 2. The focusing actuator adjusts the focus of the information reading spot based on the focus error signal. The tracking error signal is supplied to the tracking actuator (not shown) incorporated in the recording/reproducing head 2. The tracking actuator adjusts the position to form the information reading spot in the radial direction of the disc based on the tracking error signal. The slider driving signal is supplied to the slider 10. The slider 10 moves the recording/reproducing head 2 in the radial direction of the disc at a speed corresponding to the slider driving signal.

The light receiving signals Ra to Rd are supplied to a head amplifier 25 provided with adders 21 to 23 and a subtractor 24. An adder 21 counts the light receiving signals Ra and Rd and adder 22 counts the light receiving signals Rb and Rc. Thus, the adder 21 counts the light receiving signals Ra and Rd obtained by light being received at the light receiving faces 20a and 20d respectively of the four-section optical detector 20 and outputs the sum light receiving signal $R_{a+d}$. The adder 22 counts the light receiving signals Rb and Rc obtained by light being received at the light receiving faces 20b and 20c respectively of the four-section optical detector 20 and outputs the sum light receiving signal $R_{b+c}$.

The adder 23 totals the output signals $R_{a+d}$ and $R_{b+c}$ from the adders 21 and 22. The output signal from the adder 23 is the read signal, or RF signal, and is supplied to an information data reproduction circuit 30. After binarizing the read signal, the information data reproduction circuit 30 reproduces the information data (video data, sound data and computer data) recorded on the optical disc 1 by executing demodulation, error correction, and various information decoding one by one, then outputs them.

The subtractor 24 subtracts the output signal $R_{b+c}$ of the adder 22 from the output signal $R_{a+d}$ of the adder 21. The output signal of the subtractor 24 becomes the signal showing the frequency caused by wobbling of the groove track 103 and is supplied to a spindle servo device 26 of the spindle motor 9. The spindle servo device 26 rotationally drives the spindle motor 9 so that the frequency obtained from the output signal of the subtractor 24 becomes the frequency corresponding to the predetermined revolution speed. The configuration of the spindle servo device 26 has already been disclosed in Japanese Patent Application Laid-open No. 283638/1998 and an explanation of it is omitted here.

A pre-pit detection circuit 5 detects, based on the output signals from the adders 21 and 22, a land pre-pit (LPP) 104 formed on a land track (Pre-pit track) 102 of the optical disc 1 as shown in FIG. 2 and supplies the pre-pit detection signal $PP_D$ to a record processing circuit 7.

The record processing circuit 7 recognizes, based on the pre-pit detection signal $PP_D$, the position where the recording/reproducing head 2 is currently performing recording, i.e. its position on a groove track 103 and supplies to the servo control device 4 the control signal to make the recording/reproducing head 2 skip tracks from this recording position to the desired recording position. The record processing circuit 7 also generates a record modulation data signal by applying the desired record modulation to the information data to be recorded and supplies it to the recording/reproducing head 2. The recording beam light generator incorporated in the recording/reproducing head 2 generates the recording beam light corresponding to such record modulation data signal and radiates it onto the groove track 103 on the optical disc 1. At that time, the heat is transmitted to the area on the groove track 103 where such recording beam is radiated and an information pit is formed there.

The configuration of the record processing circuit 7 has also already been disclosed in Japanese Patent Application Laid-open No. 283638/1998 and an explanation of it is omitted here.

As shown in FIG. 6, the pre-pit detection circuit 5 comprises an amplifier 31 to amplify the output signal $R_{a+d}$ of the adder 21, an amplifier 32 to amplify the output signal $R_{b+c}$ of the adder 22, a subtractor 33 to subtract the output signal of the amplifier 32 from the output signal of the amplifier 31 and output the result as the radial push-pull signal (groove wobble signal) PP, a binarization circuit 34 which binarizes the push-pull signal PP output from the subtractor 33 using a threshold value to generate the above pre-pit detection signal $PP_D$ and a threshold setting circuit 35 to generate the signal showing the threshold value. The gain G1 of the amplifier 31 is set larger than the gain G2 of the amplifier 32 and G1/G2>1. The gain G1 of the amplifier 31 is, for example, 1.3 and the gain G2 of the amplifier 32 is, for example, 1.

In the pre-pit detection circuit 5 with such a configuration, the gain G1 of the amplifier 31 to amplify the output signal $R_{a+d}$ of the adder 21 is higher than the gain G2 of the amplifier 32 to amplify the output signal $R_{b+c}$ of the adder 22, and the output signal level of the amplifier 31 becomes higher than the output signal level of the amplifier 32 even if the output signal $R_{a+d}$ of the adder 21 and the output signal $R_{b+c}$ of the adder 22 are at the same level when the information reading spot is on the groove track 103 of the recording surface.

The push-pull signal PP output from the subtractor 33 is supplied to the threshold setting circuit 35 in addition to the above binarization circuit 34. The threshold setting circuit 35 calculates a threshold level to obtain the pre-pit detection signal $PP_D$ corresponding to the LPP in the binarization circuit 34 and outputs the threshold signal to show the threshold value. The threshold signal generated by the threshold setting circuit 35 is supplied to the binarization circuit 34.

The output of the adder 23 is sent to a modulation level detection circuit 36. The modulation level detection circuit 36 calculates the modulation level Mod from the amplitude of the RF signal output from the adder 23. The signal showing the modulation level Mod is supplied to a CPU 65 (to be described later) of the threshold setting circuit 35.

Figure 7:
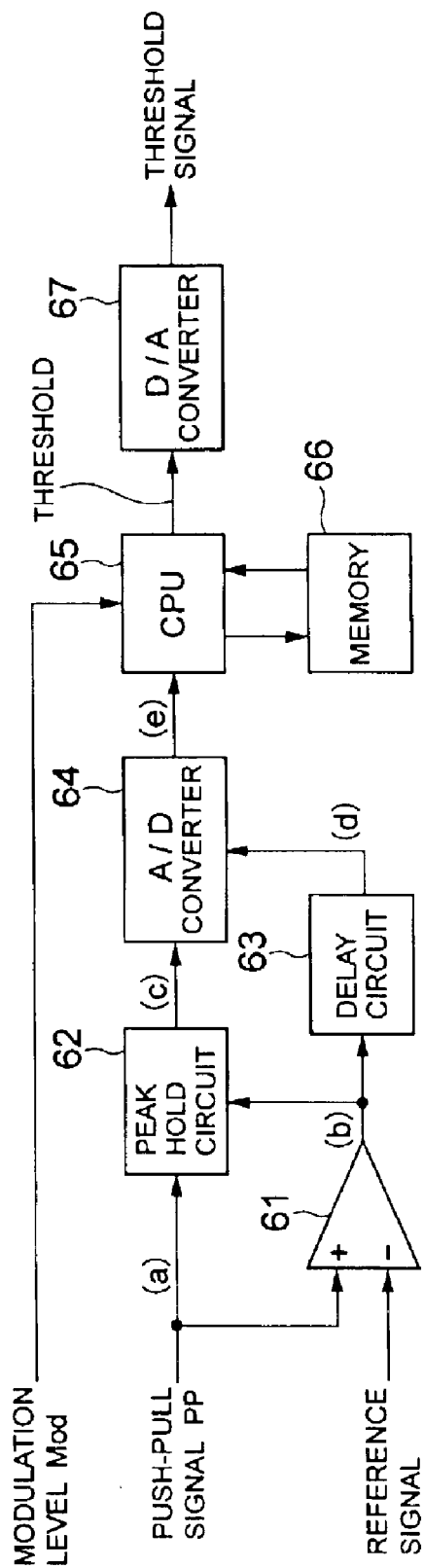
FIG. 7 is a block diagram of the configuration of a threshold setting circuit in the circuit in FIG. 6.

The threshold setting circuit 35 specifically comprises, as shown in FIG. 7, a comparator 61, a peak hold circuit 62, a delay circuit 63, an A/D converter 64, a CPU 65, a memory 66 and a D/A converter 67. The comparator 61 compares the push-pull signal (groove wobble signal) and the reference signal to generate a binary signal. The binary signal output from the comparator 61 is supplied to the peak hold circuit 62 and the delay circuit 63. The peak hold circuit 62 detects the negative peak value of the push-pull signal in the period when the binary signal is 0 and holds the detected value during that period, and clears the peak value it has held when the binary signal is 1. The delay circuit 63 delays the binary signal for a certain time and outputs it as the sampling timing signal for the A/D converter 64. The A/D converter 64 samples the peak hold level held by the peak hold circuit 62 in response to the sampling timing signal and converts it to digital data. The CPU 65 has the memory 66 to store the peak hold level data by an operation described later and calculates the slice level using such storage data. The D/A converter 67 converts the slice level calculated by the CPU 65 to an analog signal. The memory 66 is for storing thresholds TH1, TH2, and TH3 (to be described later) in a rewritable form.

Next, the threshold calculation operation of the threshold setting circuit 35 for the optical disc 1 will be explained below using waveform diagrams of various sections and flowcharts. Note that the optical disc 1 used here is an optical disc such as a DVD-RW or DVD-R having the LPP as shown in FIG. 2. In addition, this threshold calculation operation is executed for a recorded area, a not-yet-recorded area, and a embossed area on the optical disc 1.

Figure 8:
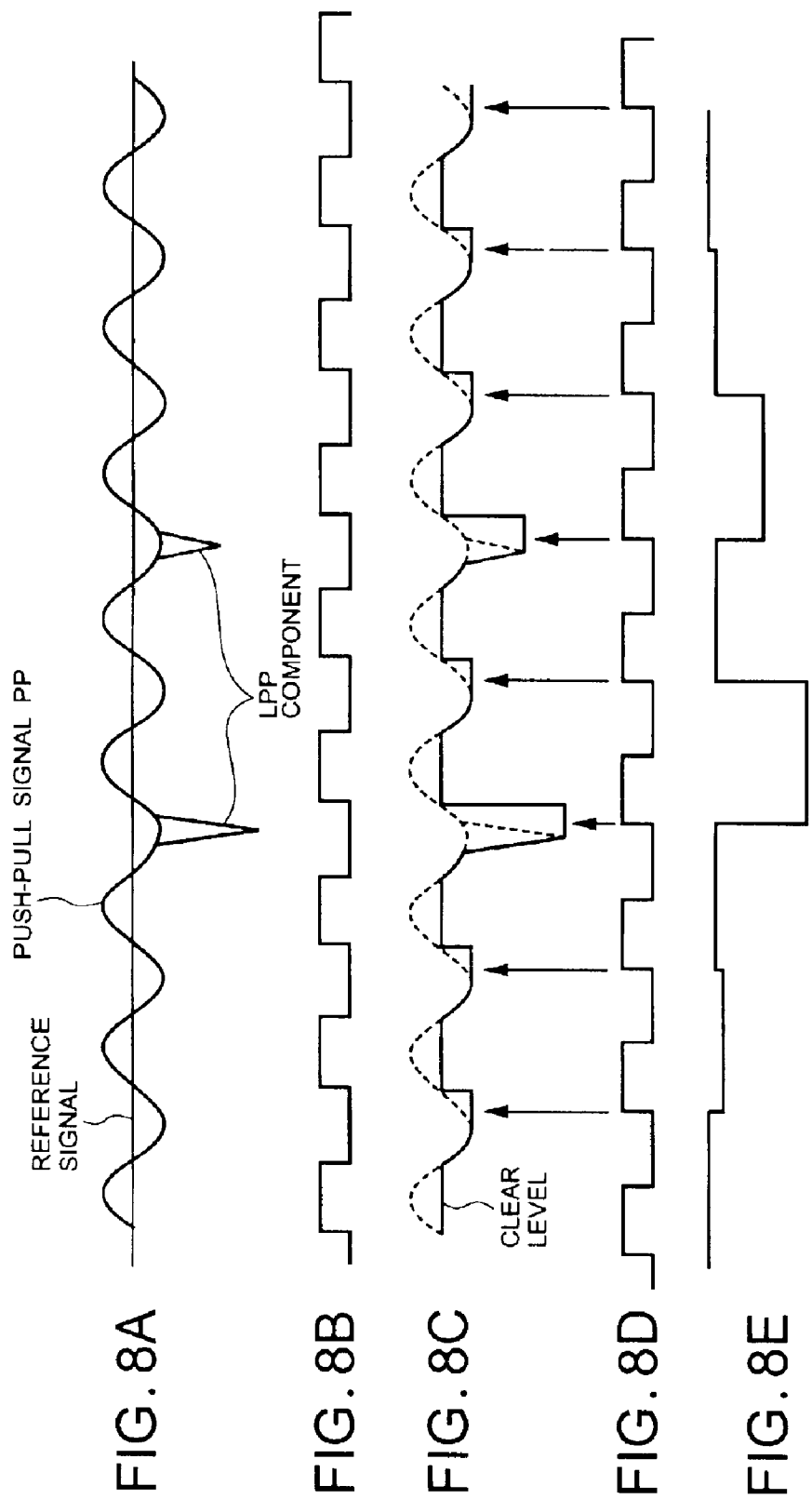
FIGS. 8A to 8E are waveform diagrams showing the operations of various sections in the threshold setting circuit in FIG. 7.

The push-pull signal PP output from the subtractor 33 of the recording/reproducing head 2 is a sine wave as shown in FIG. 8A. (To be precise, it is a waveform very similar to a sine wave, but to make it easy to explain, we call it a sine wave.) It reflects groove 103 wobbled as shown in FIG. 2 for the optical disc 1. In addition, as shown in FIG. 8A, the section corresponding to the LPP in the push-pull signal, i.e. the LPP component, protrudes from the sine waveform to the negative side. The push-pull signal is compared with the reference signal by the comparator 61 and becomes a binary signal with the waveform as shown in FIG. 8B. The binary signal becomes the pulse signal which indicates 1 when the push-pull signal level is higher than the reference signal level and indicates 0 when the push-pull signal level is not higher than the reference signal level. In addition, for the push-pull signal, the peak value of the negative level is detected by the peak hold circuit 62. The peak hold operation starts every time the binary signal rises and the held value is cleared at every rising. Thus, as shown in 8C, the output is at the clear level in the range where the push-pull signal PP is higher than the reference level. While the push-pull signal PP is equal to or less than the reference signal level, the peak value is updated following the level of the push-pull signal until the negative peak of the push-pull signal is reached, but after the negative peak is reached, that negative peak value is maintained. Therefore, the section corresponding to the LPP is detected as the peak value.

The binary signal output from the comparator 61 is delayed by the delay circuit 63 for a time longer than one-fourth but shorter than one-half of the cycle of the push-pull signal PP and becomes as shown in FIG. 8D. In response to the rise of the delayed signal, the A/D converter 64 samples the output value of the peak hold circuit 62 and supplies the digital signal with its value changing as shown in FIG. 8E to the CPU 65.

Figure 9:
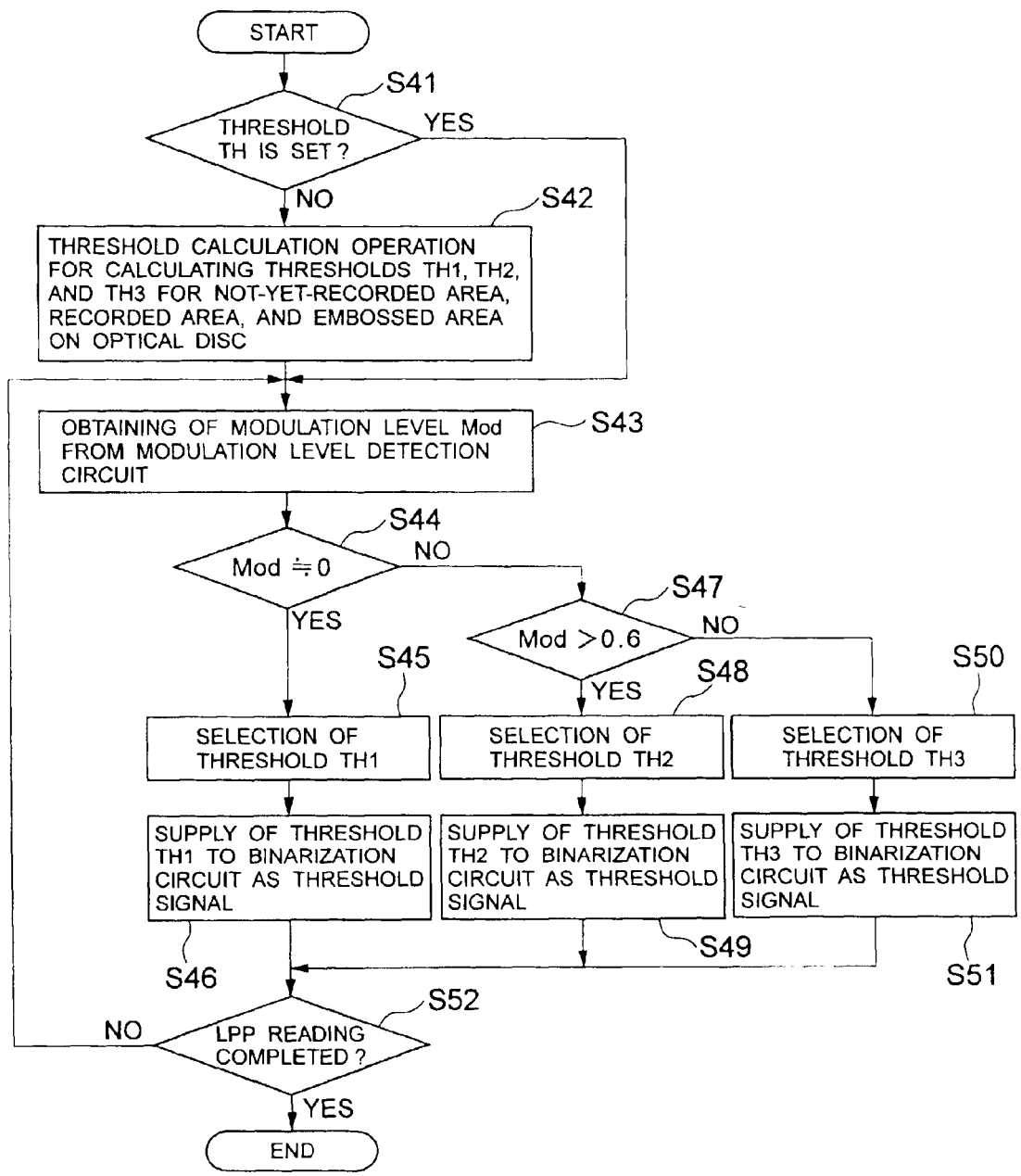
FIG. 9 is a flowchart illustrating a threshold signal generation operation by a CPU in the threshold setting circuit in FIG. 7.

As shown in FIG. 9, when the optical disc 1 is set for recording or reproduction, the CPU 65 judges whether a threshold TH is set or not for that optical disc 1 (Step S41). If the threshold TH is not set, the threshold TH is calculated for the not-yet-recorded area, the recorded area and the embossed area of the optical disc 1 (Step S42). This operation in Step S42 is the threshold calculation operation. The threshold calculation operation is executed for the not-yet-recorded area, the recorded area, and the embossed area of the optical disc 1.

Figure 10:
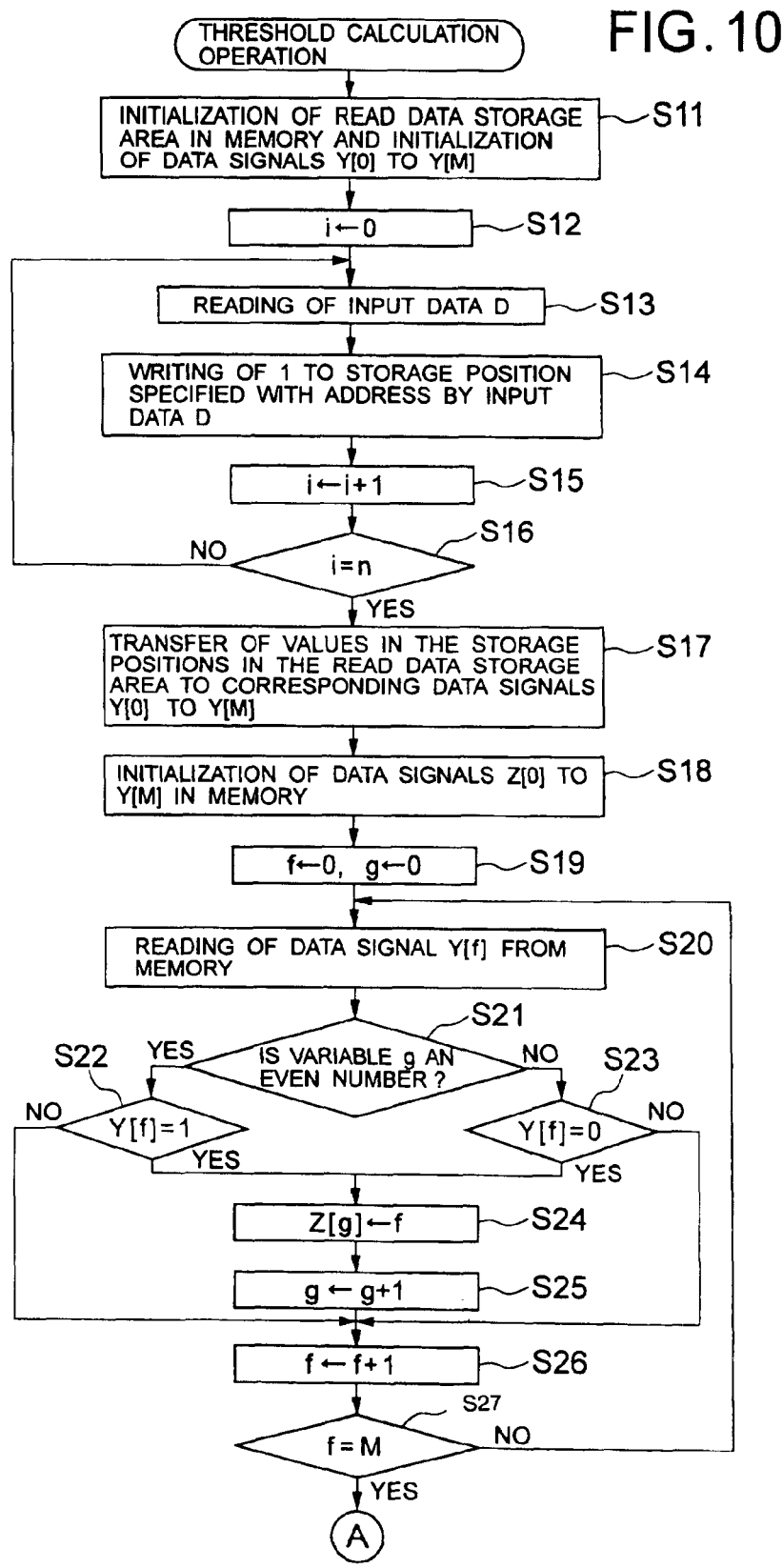
FIG. 10 is a flowchart illustrating a threshold calculation operation by the CPU in the threshold setting circuit in FIG. 7.

When calculating the threshold TH for each area, the CPU 65 first initializes the read data storage area in the memory 66 to 0 and initializes M+1 (M is a positive integer) data signals Y[0] to Y[M] formed in the memory 66 to 0 as shown in FIG. 10 (Step S11), then sets a variable i to 0 (Step S12). The read data storage area is an area for which the output data of the A/D converter 64 is specified as the address and comprises M+1 storage positions. The data signals Y[0] to Y[M] are provided in accordance with the number of resolutions the A/D converter 64 has, which correspond to the storage positions in the read data storage area. The CPU 65 reads the output of the A/D converter 64 as data D in synchronism with the sampling frequency of the A/D converter 64 (Step S13) and writes 1 at the storage position in the read data storage area corresponding to the data D by deeming the data D as the address in the memory 66 (Step S14). It adds 1 to the variable i (Step S15) and judges whether variable i reaches the data taking count n (Step S16). If i<n, control returns to Step S13 and reads the next output of the A/D converter 64 as the data D. If i=n, n pieces of data for a predetermined period have been read, and the CPU 65 transfers the values at the storage positions in the read data storage area to the corresponding data signals Y[0] to Y[M] (Step S17).

After executing Step S17, the CPU 65 initializes M+1 data signals Z [0] to Z[M] formed in the memory 66 to 0 (Step S18) and sets variables f and g both to 0 (Step S19). The data signals Z [0] to Z[M] are provided in accordance with the number of resolutions the A/D converter 64 has, which correspond to the storage positions in the read data storage area. The CPU 65 reads out a data signal Y[f] from the memory 66 (Step S20) and judges whether the variable g is even or odd (Step S21). If the variable g is even, it judges whether the data signal Y[f] is 1 or not (Step S22). If the variable g is odd, it judges whether the data signal Y[f] is 0 or not (Step S23). If it is found that Y[f]=1 at Step S22 or that Y[f]=0 at Step S23, a data signal Z [g] is made equal to f (Step S24). Then 1 is added to the variable g (Step S25) and 1 is added to the variable f (Step S26). Next, it is judged whether the variable f reaches the fixed value M (Step S27). If f<M, the control returns to Step S20 and reads out the next data signal Y[f] from the memory 66.

If it is found that Y[f]=0 at Step S22 or that Y[f]=1 at Step S23, control immediately goes to Step S26. By the operation from Step S19 to Step S27, the values of f when the data signal Y[f] changes from 0 to 1 and from 1 to 0 are written sequentially to a data signal Z[g].

Figure 11:
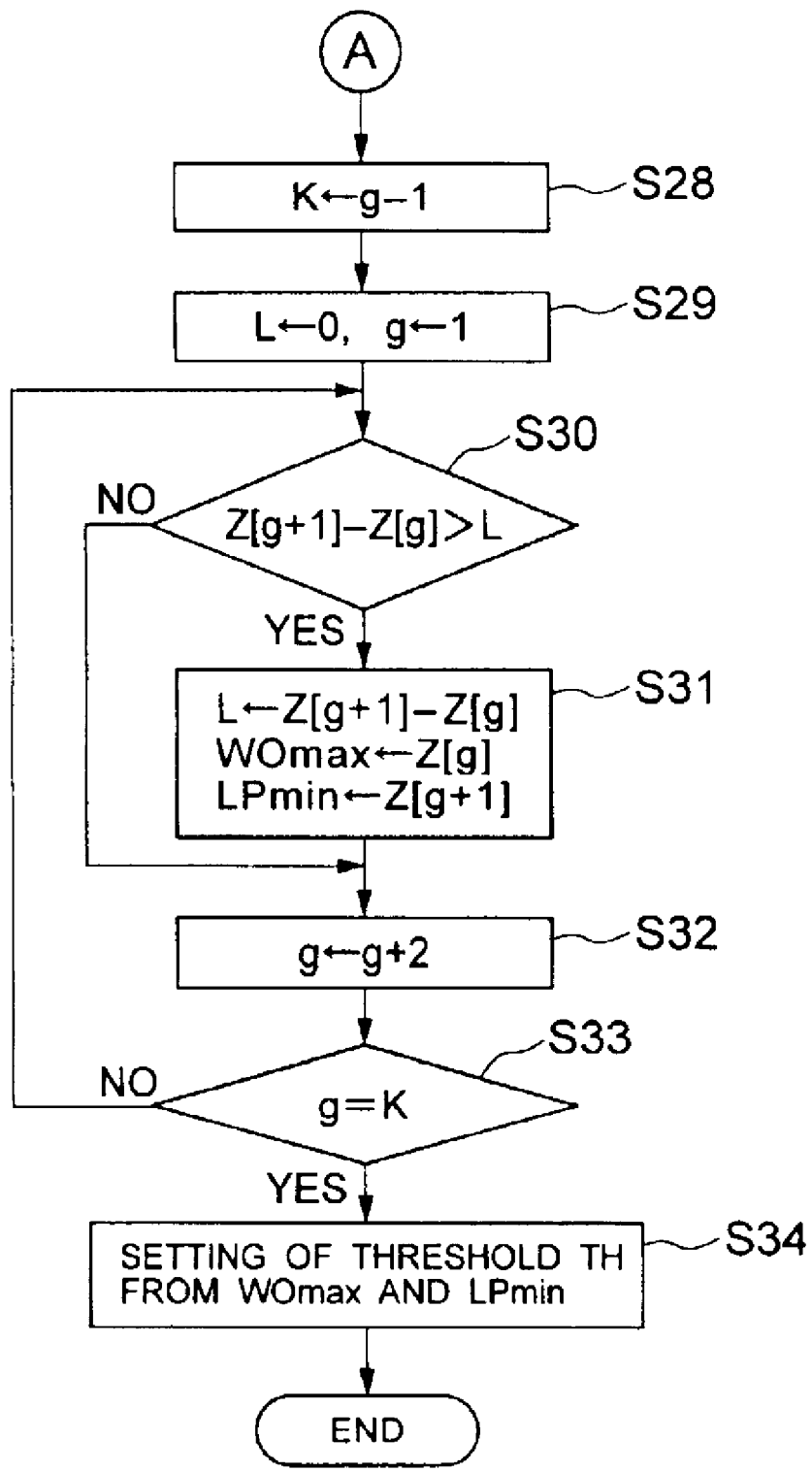
FIG. 11 is a flowchart illustrating a continued section of the threshold calculation operation in FIG. 10.

If f=M at Step S27, the value obtained by subtracting 1 from the variable g is K (Step S28), as shown in FIG. 11. The value of K is the value of g for the final value setting to the data signal Z [g] at Step S24.

Next, the CPU 65 sets a variable L to 0 and sets the variable g to 1 (Step S29). It judges whether Z[g+1]−Z[g] is larger than the variable L or not (Step S30). Z[g+1]−Z[g] is Z [even number]−Z [odd number], and this shows the length of the area where 0 continues. If Z[g+1]−Z[g]>L, the CPU 65 sets the variable L as Z [g+1]−Z[g], sets the maximum value WOmax of the wobbling groove section to Z [g] and the minimum value LPmin of the LPP section to Z[g+1] (Step S31). Then it adds 2 to the variable g (Step S32) and judges whether the variable g is equal to K (Step S33). If g<K, the control returns to Step S30 and judges whether Z [g+1]−Z [g]>L using a new Z [even number] and Z [odd number] obtained by Step S32.

If [g+1]−Z[g]≦L at Step S30, control immediately goes to Step S32.

If g=K at Step S33, the threshold TH is calculated using the maximum value WOmax of the wobbling groove section and the minimum value LPmin of the LPP section (Step S34).

Figure 12:
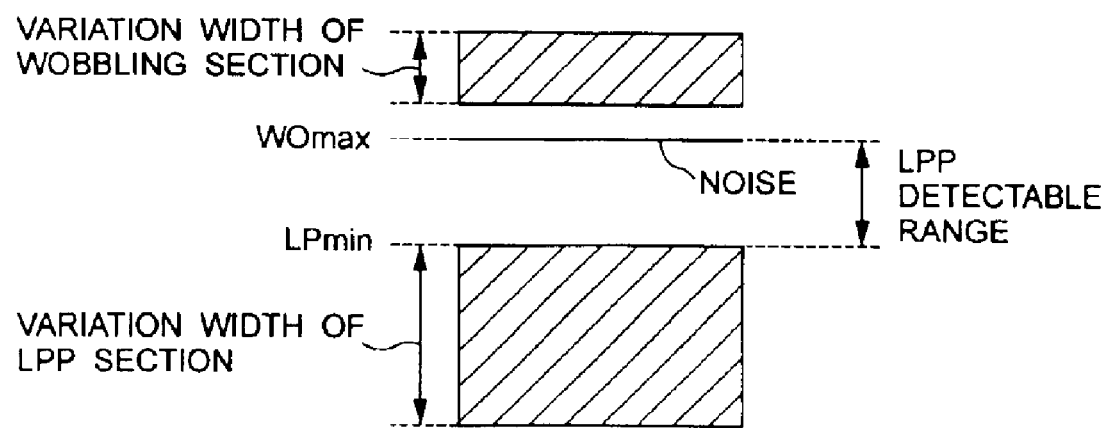
FIG. 12 is a diagram of level distribution of the push-pull signal PP.

FIG. 12 shows an example of level distribution indicated by the data signals Y[0] to Y[M] sampled. In this distribution, noise is contained at the level separated from the fluctuation width of the wobbling groove section in the push-pull signal PP and the fluctuation width of the LPP section in the push-pull signal. In the area between this noise level and the minimum value LPmin of the fluctuation width of the LPP section, the area where 0 continues has the maximum length and the noise level is the maximum value WOmax of the wobbling groove section. Between the minimum value LPmin of the fluctuation width of the LPP section and the maximum value WOmax is the range where LPP can be detected. The threshold value TH is set within this range.

The threshold value TH can be calculated in Step S34 by one of the three methods below.
(1) Add a certain offset value ΔV1 to the maximum value WOmax of the wobbling groove section (TH=WOmax−ΔV1),
(2) Subtract a certain offset value ΔV2 from the minimum value LPmin of the fluctuation width of the LPP section (TH=LPmin−ΔV2)
(3) Calculate the average of the maximum value WOmax of the wobbling groove section and the minimum value LPmin of the variation width of the LPP section (TH=WOmax+LPmin)/2)

Note that the offset values ΔV1 and ΔV2 are largest in the not-yet-recorded area on the optical disc 1, become smaller in the embossed area, and even smaller in the recorded area.

Figure 13:
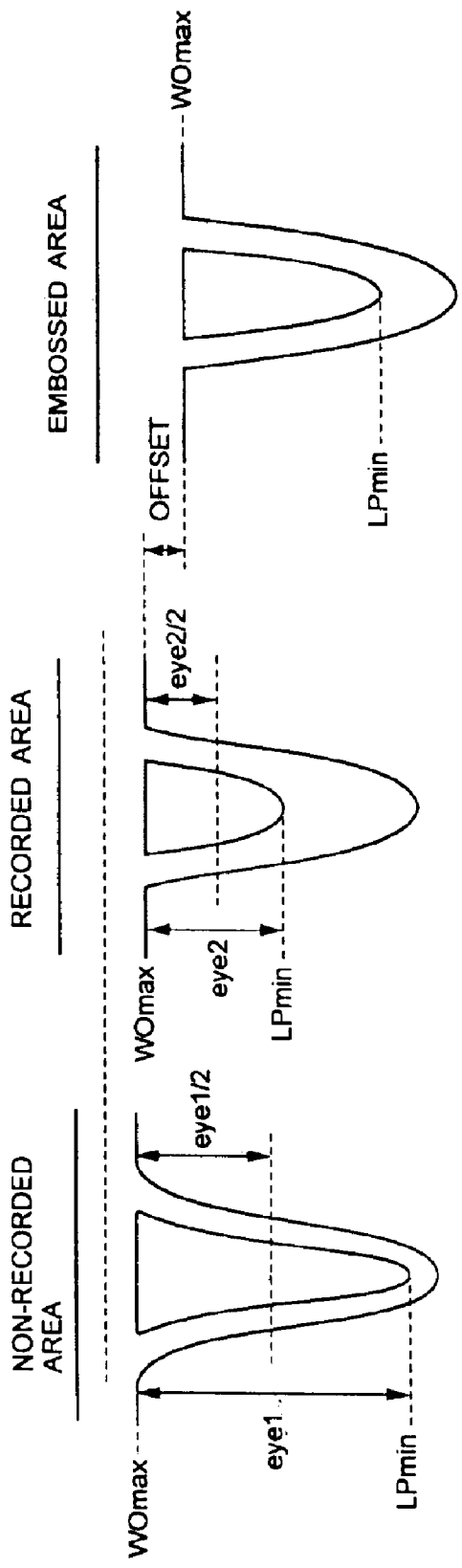
FIGS. 13A to 13C are overlaid waveform diagrams of push-pull signals containing LPP components for a not-yet-recorded area, a recorded area and an embossed area.

A overlaid waveform formed by overlaying the push-pull signals PP corresponding to the LPPs in the not-yet-recorded area on the optical disc 1 is as shown in FIG. 13A. On the other hand, the overlaid waveform of the push-pull signals PP corresponding to the LPPs in the recorded area on the optical disc 1 is as shown in FIG. 13B. As understood from FIGS. 13A and 13B, the difference eye1 between the minimum value LPmin of the LPP section and the maximum value WOmax of the wobbling groove section in the not-yet-recorded area is larger than their difference eye2 in the recorded area, resulting in a larger range of binarizability. Suppose for example that the middle value eye1/2 in the not-yet-recorded area is adopted as the threshold TH1 and also as the threshold TH2 for the recorded area. It then becomes difficult to detect LPP in the recorded area. On the contrary, if the middle value eye2/2 in the recorded area is adopted as the threshold TH2 and also as the threshold TH1 for the not-yet-recorded area, a large range of binarizability in the not-yet-recorded area cannot be utilized sufficiently. Therefore, it is necessary to set the threshold individually for the not-yet-recorded area and the recorded area.

The overlaid waveform of the LPP section in the push-pull signal PP within the embossed area on the optical disc 1 is as shown in FIG. 13C. In other words, a level change in the maximum value WOmax in the wobbling groove section results in offset and the same threshold cannot be set. Thus, it becomes necessary to set the threshold individually for the embossed area and the data area.

The CPU 65, after executing Step S42, obtains the modulation level Mod from the modulation level detection circuit 36 to investigate the current reading position of the recording/reproducing head 2 on the optical disc 1 (Step S43). Step 43 is executed immediately if it is judged at Step S41 that the threshold TH is set.

Figure 14:
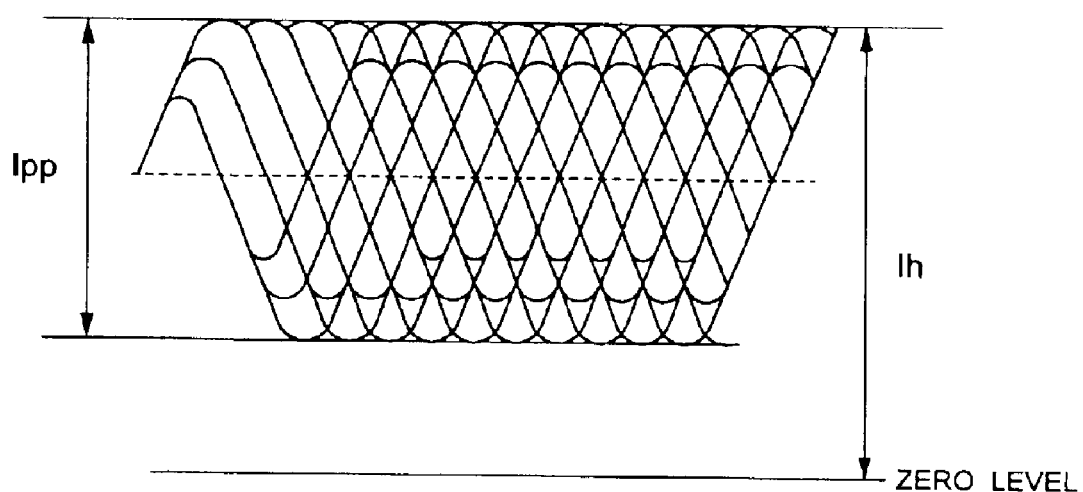
FIG. 14 is a waveform diagram of the RF signal for explaining a modulation level calculation method.

The modulation level detection circuit 36 calculates the modulation level Mod from the currently detected RF signal. The modulation level Mod is calculated from Mod=Ipp/Ih using the peak-to-peak level Ipp of the amplitude for the RF signal and the maximum value Ih from zero level. When the RF signal has the amplitude waveform shown in FIG. 14, the peak-to-peak level Ipp and the maximum value Ih are as shown in FIG. 14.

When the modulation level Mod is obtained, the CPU 65 judges whether modulation level Mod is substantially 0 or not (Step S44). If Mod is almost 0, the current reading position of the recording/reproducing head 2 is considered to be in the not-yet-recorded area and the threshold TH1 is selected (Step S45). The analog signal representing the threshold TH1 is supplied to the binarization circuit 34 via the D/A converter 67 (Step S46). If Mod is not substantially 0, it is judged whether the modulation level Mod is larger than 0.6 or not (Step S47). If Mod>0.6, the current reading position of the recording/reproducing head 2 is considered to be in the recorded area. In this case, the threshold TH2 is selected (Step S48) and the analog signal representing the threshold TH2 is supplied to the binarization circuit 34 via the D/A converter 67 (Step S49). If Mod≦0.6, the current reading position of the recording/reproducing head 2 is considered to be in the embossed area, the threshold TH3 is selected (Step S50) and the analog signal representing the threshold TH3 is supplied to the binarization circuit 34 via the D/A converter 67 (Step S51).

Thus, the binarization circuit 34 uses the threshold corresponding to the area where the reading position of the disc 1 is currently positioned to detect LPP. The binarization circuit 34 supplies the pre-pit detection signal $PP_D$, which indicates detection of an LPP, to the record processing circuit 7 and the record processing circuit 7 judges the address and other information on the optical disc 1 corresponding to the pre-pit detection signal $PP_D$.

The CPU 65 repeats the operation from Step S43 to Step S51 above until LPP reading is completed (Step S52).

In the above example the thresholds TH1, TH2, and TH3 for each area of the optical disc 1 are set in advance and then the LPP is read, but the threshold for the reading area may be updated as required during execution of LPP reading on the optical disc 1, as shown in FIG. 15.

Referring to FIG. 15, the CPU 65 obtains the modulation level Mod from the modulation level detection circuit 36 to judge the current reading position of the recording/reproducing head 2 on the optical disc 1 (Step S61). The modulation level Mod is, as described above, calculated from Mod=Ipp/Ih using the peak-to-peak level Ipp of the amplitude for the RF signal and the maximum value Ih from zero level.

When the modulation level Mod is obtained, the CPU 65 judges whether its modulation level Mod is substantially 0 or not (Step S62). If Mod is almost 0, the current reading position of the recording/reproducing head 2 is considered to be in the not-yet-recorded area and the threshold TH1 for the not-yet-recorded area stored in the memory 66 is read out. The analog signal representing the read out threshold TH1 is supplied to the binarization circuit 34 via the D/A converter 67 (Step S63). Then the above threshold calculation operation is executed (Step S64) and the resulting threshold TH is set as the threshold TH1 to update TH1 in the memory 66 (Step S65). Next, via the D/A converter 67, the analog signal representing the newest threshold TH1 is supplied to the binarization circuit 34 (Step S66). If Mod is not substantially 0, it is judged whether the modulation level Mod is larger than 0.6 or not (Step S67). If Mod>0.6, the current reading position of the recording/reproducing head 2 is considered to be in the recorded area. In this case, the threshold TH2 for the recorded area stored in the memory 66 is read out and, via the D/A converter 67, the analog signal representing the read out threshold TH2 is supplied to the binarization circuit 34 (Step S68). The above threshold calculation operation is then executed (Step S69) and the resulting threshold TH is set as the threshold TH2 and TH2 in the memory 66 is updated (Step S70). Next, via the D/A converter 67, the analog signal representing the newest threshold TH2 is supplied to the binarization circuit 34 (Step S71). If Mod≦0.6, the current reading position of the recording/reproducing head 2 is considered to be in the embossed area, the threshold TH3 for the embossed area stored in the memory 66 is read out and the analog signal representing the read out threshold TH3 is supplied to the binarization circuit 34 via the D/A converter 67 (Step S72). The above threshold calculation operation is executed (Step S73) and the resulting threshold TH is set as the threshold TH3 and TH3 in the memory 66 is updated (Step S74). Next, via the D/A converter 67, the analog signal representing the newest threshold TH3 is supplied to the binarization circuit 34 (Step S75).

The CPU 65 repeats the operation from Step S61 to Step S75 above until LPP reading is completed (Step S76).

As described above, according to the present invention, the threshold setting for the push-pull signal in order to detect the pre-pit can be performed appropriately.

This application is based on Japanese Patent Application No. 2001-30108 which is hereby incorporated by reference.

What is claimed is:

1. A pre-pit detecting apparatus for an optical recording medium having a recording surface provided with pre-pits which are repeatedly formed between tracks and carries information related to said tracks, comprising:

an optical head having a light receiving surface divided into a first and second light receiving faces in the tangential direction of said track, for receiving the reflected light of a light beam radiated onto said recording surface on said first and second light receiving faces to output first and second light detection signals corresponding to respective amounts of the received light on said first and second light receiving faces;

a subtractor for calculating the difference between said first and second light detection signals output from said optical head to generate a push-pull signal;

a binarization device for comparing said push-pull signal with a threshold value to generate a pre-pit detection signal;

a judging device for judging an area to which a position of said recording surface where the light beam is radiated by said optical head belongs of a plurality of areas including at least a not-yet-recorded area and a recorded area; and a threshold setting device for setting said threshold value corresponding to the judgement result of said judging device.

2. A pre-pit detecting apparatus according to claim 1, wherein said plurality of areas include the embossed area in addition to the not-yet-recorded area and the recorded area.

3. A pre-pit detecting apparatus according to claim 1, wherein, immediately after the optical recording medium is set, said threshold setting device sets said threshold value for each of said plurality of areas on the set recording medium corresponding to the judgement result of said judging device and stores the set threshold values in the memory, then reads a threshold value of an area corresponding to the judgement result of said judging device from said memory and supplies the read threshold value to said binarization device.

4. A pre-pit detecting apparatus according to claim 1, wherein said threshold setting device includes a memory having storage positions for threshold values corresponding to said plurality of areas, and for every time a threshold value is newly set in accordance with the judgement result of said judging device, said threshold value at a storage position corresponding to an area of the judgement result is updated in accordance with the new threshold value.

5. A pre-pit detecting apparatus according to claim 4, wherein said threshold setting device includes an area change detector for detecting that an area in said recording surface onto which the light beam is radiated is changed to another area in accordance with the judgement result of said judging device, and when said area change detector detects change to another area, said threshold for the area corresponding to the judgement result of said judging device is read from said memory and supplied to said binarization device.

6. A pre-pit detecting apparatus according to claim 1, wherein said threshold setting device samples said push-pull signal to collect sample data for a predetermined period and sets said threshold value by adding a first predetermined value to the maximum value of data corresponding to a track, of the collected sample data, and said first predetermined value is different for a not-yet-recorded area, a embossed area, and a recorded area, said first predetermined value for the not-yet-recorded area is larger than said first predetermined value for the embossed area, and said first predetermined value for the embossed area is larger than said first predetermined value for the recorded area.

7. A pre-pit detecting apparatus according to claim 1, wherein said threshold setting device samples said push-pull signal to collect sample data for a predetermined period and sets said threshold value by subtracting a second predetermined value from the minimum value of data corresponding to a track, of the collected sample data, and said second predetermined value is different for a not-yet-recorded area, a embossed area, and a recorded area, said second predetermined value for the not-yet-recorded area is larger than said second predetermined value for the embossed area, and said second predetermined value for the embossed area is larger than said second predetermined value for the recorded area.

8. A pre-pit detecting apparatus according to claim 1, wherein said judging device includes calculator for calculating a modulation level in accordance with an output signal from said optical head and judges said plurality of areas in accordance with said modulation level.

9. A pre-pit detection method for an optical recording medium having a recording surface provided with pre-pits which are repeatedly formed between tracks and carries information related to said tracks, comprising:

an optical step for receiving the reflected light of a light beam radiated onto said recording surface, on a light receiving surface having first and second light receiving faces divided in the tangent direction of said track, to output first and second light detection signals corresponding to respective amounts of the received light on said first and second light receiving faces;

a subtraction step for calculating the difference between said first and second light detection signals to generate a push-pull signal;

a binarization step for comparing said push-pull signal with a threshold value to generate a pre-pit detection signal;

a judging step for judging an area to which a position of said recording surface where the light beam is radiated in said optical step belongs of a plurality of areas including at least a not-yet-recorded area and a recorded area; and a threshold setting step for setting said threshold value corresponding to the judgement result of said judging step.

10. A detecting process executed in a pre-pit detecting apparatus for an optical recording medium having a recording surface provided with pre-pits which are repeatedly formed between tracks and carries information related to said tracks, wherein a computer data signal embodied in a carrier wave and representing a series of instructing causes a computer to perform steps, said steps comprising an optical step for receiving the reflected light of a light beam radiated onto said recording surface, on a light receiving surface having first and second light receiving faces divided in the tangent direction of said track, to output first and second light detection signals corresponding to respective amounts of the received light on said first and second light receiving faces; a subtraction step for calculating the difference between said first and second light detection signals to generate a push-pull signal; and a binarization step for comparing said push-pull signal with a threshold value to generate a pre-pit detection signal, said steps further comprising:

a judging step for judging an area to which a position of said recording surface where the light beam is radiated in said optical step belongs of a plurality of areas including at least a not-yet-recorded area and a recorded area; and a threshold setting step for setting said threshold value corresponding to the judgement result of said judging step.

* * * * *